Feb. 11, 1958     G. L. BALL     2,822,603

SLASHER CREEL BRAKE

Filed July 19, 1954

INVENTOR.
GAINES LAMAR BALL
BY
ATTORNEY

United States Patent Office 2,822,603
Patented Feb. 11, 1958

2,822,603

SLASHER CREEL BRAKE

Gaines L. Ball, West Point, Ga., assignor to Batson-Cook Company, West Point, Ga., a corporation of Georgia Application July 19, 1954, Serial No. 444,147

5 Claims. (Cl. 28—28)

This invention relates to brakes in general and more particularly to a slasher creel brake.

In slasher machines, it has been found desirable to have a very low braking torque on the slasher creels while the machine is running. The braking torque should be sufficient to prevent any slackness in the yarn being unwound from the spool, yet not great enough to introduce undesirable stretch in the yarn. Also, when the slasher machine is stopped, the spools will continue to rotate, due to inertia, unless some provision is made for stopping the spools at the same time the slasher machine is stopped. If the spools do not stop with the slasher machine, the result is tangled yarn which causes considerable trouble and waste.

In the past, slasher creel brakes have utilized the rope brake principle in which a rope encircles the head of the spool or beam and has a weight at one end to exert a force on the rope; the other end of the rope being connected to the frame of the slasher. The force of the weight exerts a constant braking torque on the spool or beam regardless of the speed of the machine. This constant torque causes considerable stretch in the yarn which has been found to be detrimental.

Another disadvantage to the prior art devices is the difficulty in maintaining the desired adjustment. This difficulty arises from the size variations in the individual spools and stretch in the rope that occurs with age and with changes in the humidity.

It is therefore an object of my invention to provide a slasher creel brake that will apply a varying braking torque; a low braking torque, while slasher is running and full braking torque when the slasher is stopped.

Another object of my invention is to provide a slasher creel brake that will apply a varying braking torque automatically.

A further object of my invention is to provide a slasher creel brake that is universally adaptable to various sizes of spools.

A still further object of my invention is to provide a slasher creel brake that is simple to install and operate and is inexpensive to manufacture.

Other and further objects and advantages will become apparent from the following disclosure when taken in conjunction with the accompanying drawings in which like characters of reference designate corresponding parts throughout the several views, and wherein.

Figure 1:
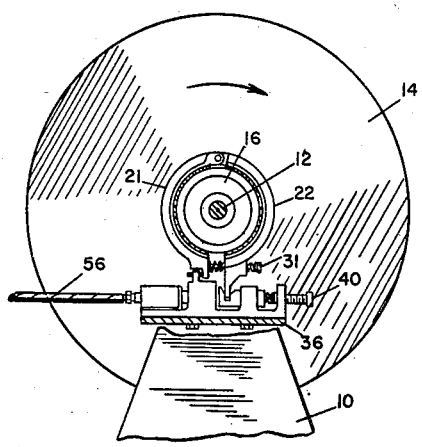
Fig. 1 is an end view of a creel spool with my brake installed.
Figure 2:
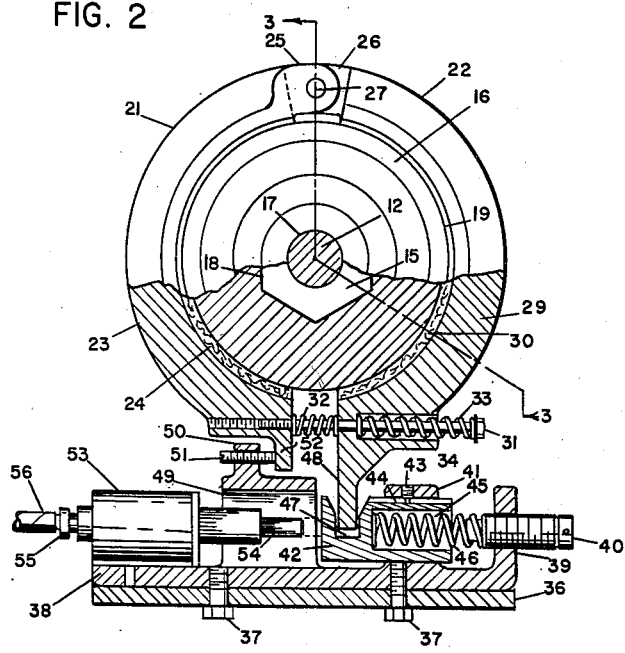
Fig. 2 is a partial sectional view taken along line 2—2 in Fig. 3.
Figure 3:
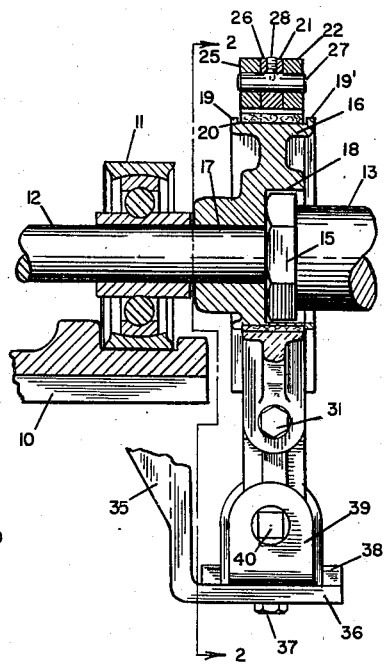
Fig. 3 is a partial sectional view taken along line 3—3 in Fig. 2.

Referring now in detail to the embodiment chosen for purpose of illustration, the numeral 10 denotes generally the slasher machine frame to which is mounted creel beam bearing 11. Extending through and rotatably supported in bearing 11 is beam shaft 12. One end of shaft 12 is securely fastened to creel beam hub 13 which is an integral part of the spool 14 and projects outwardly from each end thereof. At the junction of the beam shaft 12 and beam hub 13 is hexagonal nut 15 which is a standard size on all creel beam spools 14.

A circular metallic brake drum 16 is provided with a concentric journal aperture 17 through which beam shaft 12 is slideably mounted. The inner end of aperture 17 is enlarged and formed into a hexagonal socket 18 which fits snugly over hexagonal nut 15. It may therefore be seen that the brake drum 16 must rotate with the creel beam hub 13 and spool 14 and conversely any braking torque applied to the brake drum 16 is transmitted to the creel beam hub 13 and spool 14 through the non-rotatable connection between the socket 18 and nut 15.

Lips 19, 19' project outwardly from the outer periphery of brake drum 16 and at the outer edges thereof forming recess 20 in which brake shoes 21, 22 ride. Brake shoe 21 consists of a metallic member 23 which is T-shaped in cross-section and semi-circular in shape and conforms to the curvature of the brake drum 16. Affixed in a conventional manner to the inner surface of member 23 is a fibrous non-metallic brake lining 24. At the upper end of shoe 21 is yoke 25 into which is slideably fitted tongue 26 at the upper end of shoe 22. Yoke 25 and tongue 26 are pivotally mounted together by means of pin 27 which is retained in position by means of retaining screw 28 which is threadably engaged in tongue 26. Brake shoe 22 consists of a metallic member 29 which is T-shaped in cross-section and semi-circular in shape and conforms to the curvature of brake drum 16. A fibrous non-metallic brake lining 30 is affixed in the conventional manner to the inner surface of member 29.

Slideably extending through the lower end of shoe 22 and threadably engaging the lower end of shoe 21 is adjustment screw 31. Surrounding screw 31 between shoes 21, 22 is release spring 32 which acts simultaneously on shoes 21, 22 tending to force them apart. Holding shoe 22 in the desired position relative to shoe 21 is spring 33 which surrounds bolt 31 between the bottom of recess 34 in the lower end of shoe 22 and the head of bolt 31. It will therefore be seen that by adjustment of bolt 31, spring 33 can be compressed to cause shoe 22 to be urged toward shoe 21 against the spring 32. As the lower ends of shoes 21, 22 are thus brought together, they exert a force on the drum 16 and, due to the relatively high coefficient of friction between drum 16 and linings 24, 30, tend to prevent or stop any rotation of drum 16. Conversely, if adjustment screw is rotated to remove the compressive force on spring 33, thereby permitting spring 32 to urge the lower ends of shoes 21, 22 apart, thereby decreasing the force on drum 16 with the corresponding decrease in braking effect due to friction between linings 24, 30 and drum 16.

Housing bracket 35 is affixed at its upper end to the slasher machine frame 10 by any conventional means. Bracket 35 extends downwardly below the ends of brake shoes 21, 22 where an integral housing support member 36 projects perpendicularly to the downwardly extending portion of the bracket 35, and extends sufficiently to be directed under the ends of shoes 21, 22, with its longitudinal axis extending transversely to that of the shaft 12. Mounted on the upper surface of support member 36 by means of bolts 37 is the piston housing 38. At one end of housing 38 is the integral vertically projecting lug 39 through which piston adjusting screw 40 is threadably engaged. Adjacent to lug 39 is cylinder 41 which is integral with housing 38 and through which brake piston 42 is slideably mounted. Piston 42 is free to slide in cylinder 41 but is prevented from rotating by means of dog point set screw 43 which threadably engages the top of cylinder 41 and extends downward to slideably engage slot 44 in the top of piston 42. One end of piston 42 has recess 45 to receive actuating spring 46, which acts between the bottom of recess 45 and adjusting screw 40. Adjacent the other end of piston 42 is transverse slot 47 which operably engages the actuating lug 48 at the lower end of shoe 22.

In substantially the center of housing 38 is the hollow cylindrical support 49 which has an upwardly projecting integral alignment lug 50 through the center of which alignment screw 51 is threadably engaged. The end of screw 51 contacts the alignment foot 52 which projects downwardly from the lower end of shoe 21. The inner diameter of support 49 is such as to permit the free entry of piston 42 during any of its longitudinal movements.

Figure 4:
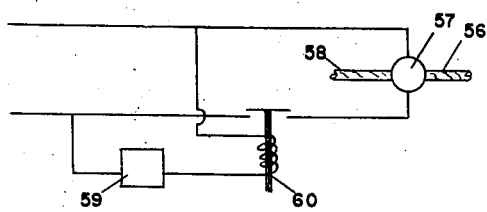
Fig. 4 is a wiring diagram used in conjunction with my brake.

Affixed to end of housing 38, opposite lug 39, is single acting air cylinder 53. The actuating rod 54 of air cylinder 53 acts through hollow support 49 and operably contacts the end of brake piston 42 against which it may exert pressure if air is introduced into air cylinder 53 through inlet 55. Air, under pressure, is directed to and released from air cylinder 53 through flexible hose 56 by means of a three-way electrically operated air valve 57; the wiring diagram is shown schematically in Fig. 4. Air from source (not shown) enters valve 57 through flexible hose 58.

A speed sensitive control 59, which is well known to those skilled in the art, energizes solenoid 60 thereby closing the circuit to valve 57 which directs the air entering through hose 58 out through hose 56 to cylinder 53 whenever the slasher is accelerating or running at operating speed. Conversely, when the slasher is decelerating or stopped, control 59 de-energizes solenoid 60, thereby breaking the circuit to valve 57 causing the air from hose 58 to be shut off and simultaneously dump the air in hose 56 and cylinder 53 to the atmosphere.

Assuming the entire brake assembly as described above has been properly installed, the alignment is then obtained by adjusting alignment screw 51 which acts on foot 52, thereby aligning shoe 21 with drum 16. This adjustment also compensates for wear in linings 24, 30. After alignment, the desired running brake torque is obtained by adjustment screw 31 which has been previously described, thereby keeping the undesirable slack out of the yarn being unwound. While the slasher is running, air is admitted to cylinder 53, causing rod 54 to act against piston 42 counteracting the force exerted by spring 46, allowing only the running brake torque to be applied to drum 16. It will be noted that the slot 47 which receives the lug 48 is of greater width than the lug. While the movement of the rod 54 is sufficient to relieve pressure on the lug 48 by the spring 46 the width of the slot is such as to avoid exertion of pressure by the rod 54 through the opposite face of the slot to tend to open the brake in opposition to the pressure of spring 33. When the slasher decelerates or stops, the air in cylinder 53 is released, thereby allowing spring 46 to exert a force, predetermined by adjustment of screw 40, on piston 42, where it is transmitted to lug 48, thereby urging shoe 22 towards shoe 21 causing an additional braking torque to be exerted on drum 16 to overcome the momentum of spool 14, thereby preventing any overrunning tendency which could entangle the yarn being unwound.

It will be obvious to those skilled in the art that various changes could be made in the embodiment chosen for purpose of illustration without departing from the scope of my invention as defined in the appended claims.

I claim:

1. Tension control mechanism for a roll of material comprising a brake drum fixed axially to said roll, brake segments hingedly secured to each other embracing said brake drum, adjusting means securing the free ends of said segments together at a normal adjusted minimum braking pressure, a lug at the free end of each segment, movable means engaging one of said lugs whereby the rotation of the roll biases the said segments apart to hold the braking pressure at its adjusted minimum, and a stop so positioned that upon movement of said movable means in the direction of rotation of the roll the other said lug contacts said stop to bias the said segments together to increase the braking pressure above the adjusted minimum.

2. A brake control comprising a brake drum, a segmental brake band engaging said drum, a lug on said brake band for actuating said band to vary its grip on said brake drum, a lug engaging means to bias the brake band toward maximum braking position, a fluid operated piston to bias said lug engaging means toward minimum braking position, and a solenoid operated valve to control the position of said fluid operated piston.

3. Brake means for variably opposing rotation of a creel beam, said means comprising a brake drum mounted on said creel beam, hinged brake segments embracing said drum, outwardly extending opposed lugs on the free ends of said brake segments, adjustable means adjacent said lugs for applying a minimum braking pressure to the drum, movable means to restrain one of said lugs, and stop means to restrain the other said lug to increase the braking pressure upon movement of said movable means toward said stop whereby the braking pressure is varied.

4. A brake drum for a creel beam comprising a cylindrical braking surface, a hub portion having an aperture concentric with said braking surface to accommodate the creel beam shaft, and a hexagonal socket concentric with said aperture to snugly engage a hexagonal fitting on the creel beam.

5. Brake mechanism for a creel beam having a rotatable shaft, a fitting on said shaft fixed for rotation with said beam, a brake drum having a cylindrical braking surface and a hub portion provided with an aperture in which said shaft is received, said hub portion being provided with a complementary recess snugly engaging the fitting on said shaft for rotation therewith, a segmental brake band engaging said drum, a lug on said brake band for actuating said band to vary its grip on said drum, a lug engaging means to bias said brake band toward maximum braking position, a fluid operated piston to bias said lug engaging means toward minimum braking position, and valve means connected to control the operation of said fluid operated piston.

References Cited in the file of this patent

UNITED STATES PATENTS

| Number | Name | Date |
|---|---|---|
| 778,668 | Hudson et al. | Dec. 27, 1904 |
| 993,550 | Robeson | May 30, 1911 |
| 1,063,263 | Howe | June 3, 1913 |
| 1,733,834 | Steele | Oct. 29, 1929 |
| 2,137,572 | Jones | Nov. 22, 1938 |
| 2,144,070 | Leinbach | Jan. 17, 1939 |
| 2,166,243 | Elvin | July 18, 1939 |
| 2,375,459 | Ballou | May 8, 1945 |
| 2,493,902 | Slocombe et al. | Jan. 10, 1950 |
| 2,562,990 | Peebles | Aug. 7, 1951 |
| 2,630,141 | Taylor | Mar. 3, 1953 |
| 2,640,655 | Johnson | June 2, 1953 |
| 2,646,081 | Ritsky | July 21, 1953 |
| 2,752,658 | Ingham | July 3, 1956 |